United States Patent Office 3,577,533
Patented May 4, 1971

3,577,533
ANTACID COMPOSITIONS CONTAINING BISMUTH ALUMINATE AND COPRECIPITATED ALUMINUM HYDROXIDE AND MAGNESIUM CARBONATE
Joseph Alfred Rider, Mill Valley, Calif.
(255 Hugo St., San Francisco, Calif. 94122)
No Drawing. Continuation-in-part of abandoned application Ser. No. 500,268, Oct. 21, 1965. This application Feb. 21, 1968, Ser. No. 707,278
Int. Cl. A61k 27/00
U.S. Cl. 424—155          3 Claims

ABSTRACT OF THE DISCLOSURE

The antacid compositions are novel pharmaceutical compositions containing bismuth aluminate and a coprecipitate of aluminum hydroxide and magnesium carbonate which are useful in the treatent of gastric disorders such as ulcer of the stomach or duodenum, gastritis, hiatal hernia, duodenitis and marginal ulcer.

RELATED APPLICATION

The present application is a continuation-in-part of my copending application Ser. No. 500,268, which was filed on Oct. 21, 1965 now abandoned.

SUMMARY OF THE INVENTION

Although there are many theories as to the etiology of the peptic ulcer, it is now generally believed that the acid-peptic action of the gastric juice probably represents the final common pathway by which many ulcer-promoting factors act upon the mucosa of the duodenum. (R. Menguy, The American Journal of Digestive Diseases, p. 199, vol. 9, No. 3, 1964.) Therefore, most regimens for the management of peptic ulcers employ, in addition to dietary control and other varied measures, some type of medication which will beneficially affect the acid-peptic action of the gastric juices. Although systemically active drugs such as anticholinergics may be often beneficially employed, antacids are the most widely accepted and employed adjuncts in the management of peptic ulcer.

The "ideal antacid" for use in the management of peptic ulcers has been described as one which is nonsystemic and which does not interfere with the acid-base balance of the blood. It is also able to quickly react with and raise the pH of the gastric acids to a level of about 3 to 5. It has little effect on the bowel function and preferably has desirable taste characteristics. In addition, and of even more importance, it is an antiprotease, that is, it is able to inhibit or inactivate the gastric proteases such as pepsin, cathepsin and the like, which attack gastric mucosal cells and other gastric substrates. The antacids currently employed possess many of the properties of an "ideal antacid," but are deficient in that they possess relatively little anti-protease activity.

DETAILED DESCRIPTION

It has now been discovered that pharmaceutical compositions containing at least one part of bismuth aluminate for each four parts of an aluminum hydroxide-magnesium carbonate codried gel are superior agents which possess antacid and antipepsin activity and more closely approach the ideal antacid than previously known compositions. It has also been discovered that the addition of anticholinergic agents such as N-ethyl-3-piperidyl diphenylacetate to the described compositions provides a combination of ingredients which are even more convenient therapeutic agents in some gastric disorders.

The bismuth aluminate, which is intended for use in the present invention, may be conveniently prepared by slowly introducing a solution of bismuth nitrate dissolved in dilute nitric acid, into a second solution containing sodium aluminate in an aqueous solution, which thus contains the ions of sodium hydroxide. The amount of nitric acid and sodium hydroxide ions which are present are preferably such that the resulting mixture will have a pH of approximately 8 to 8.5. The product which precipitates is bismuth aluminate which has the formula $$Bi_2(Al_2O_4)_3 \cdot 10H_2O$$

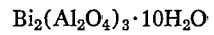

The method of preparing the compound is described in detail in U.S. Pat. No. 2,901,316.

Bismuth aluminate has been demonstrated to possess an antipeptic and demulcent activity in the gastrointestinal tract. It is a relatively weak antacid, but appears to inactivate pepsin and other gastric proteases without raising the pH. It has also been demonstrated that the bismuth aluminate possesses excellent protective qualities, thus providing a coating over mucous surfaces which protects them from further irritation.

The aluminum hydroxide-magnesium carbonate co-dried gel is a finely divided, odorless, tasteless, white powder consisting of a combination of aluminum hydroxide gel and magnesium carbonate. Upon analysis it is found to contain a minimum of 40% aluminum oxide ($Al_2O_3$), 6% magnesium oxide (MgO), and 12% carbonates ($CO_2$). It has a minimum acid consuming capacity of 260 ml. N/10 HCl per gram. It is more rapid acting than dried aluminum hydroxide gel and appears to be less constipating. (It is available in the United States from Reheis Co., Inc.)

The compound N-ethyl-3-piperidyl diphenylacetate, which may be employed in addition to the bismuth aluminate and the codried gel to obtain further beneficial results in the treatment of peptic ulcer, is a unique antispasmodic agent with powerful local anesthetic properties which brings about rapid relief of pain and spasm in the upper gastrointestinal tract. The preparation of the compound is described in detail in U.S. Pat. No. 2,918,407. Other anticholinergic agents may also be employed, if so desired.

In addition to the forementioned ingredients, the compositions of the present invention may also contain such other typical antacid ingredients as magnesium trisilicate, magnesium hydroxide, aluminum hydroxide and dihydroxyaluminum aminoacetate.

While pharmaceutical compositions containing at least one part of the bismuth aluminate to each four parts of the coprecipitate of aluminum hydroxide and magnesium carbonate may be employed, in the preferred practice of the present invention the compositions contain one part of bismuth aluminate for each three parts of the coprecipiate. The compositions may take the form of pharmaceutically acceptable liquids or solids such as tablets and liquid suspensions and may contain a suitable predetermined amount of the ingredients in addition to flavoring agents, suspending agents and the like. Suitable tablets and liquid formulations may contain in each unit dosage form from about 100 mg. to about 300 mg. of bismuth aluminate and from about 100 mg. to about 600 mg. of the coprecipitate of aluminum hydroxide and magnesium carbonate.

A typical tablet may have the following composition:

| | Mg. |
|---|---|
| Bismuth aluminate | 100 |
| Coprecipitate of aluminum hydroxide and magnesium carbonate | 300 |
| Magnesium trisilicate | 100 |

Another typical tablet may contain the following:

| | Mg. |
|---|---|
| Bismuth aluminate | 200 |
| Coprecipitate of aluminum hydroxide and magnesium carbonate | 400 |

If desired, the tablets may contain 25 mg. of the N-ethyl-3-piperidyl diphenylacetate, in addition to the above ingredients.

A typical liquid formulation may contain in each 5 cc. the following:

| | Mg. |
|---|---|
| Bismuth aluminate | 100 |
| Coprecipitate of aluminum hydroxide and magnesium carbonate | 300 |
| Magnesium trisilicate | 100 |

Water, flavoring, etc. (q.s. ad.) 5 cc.

Another typical liquid formulation may contain the following:

| | Mg. |
|---|---|
| Bismuth aluminate | 200 |
| Coprecipitate of aluminum hydroxide and magnesium carbonate | 400 |

Water, flavoring, etc. (q.s. ad.) 5 cc.

The average adult daily dose for the above formulae would be one or two tablets, or one or two teaspoonsful three times a day.

The novel compositions of the present invention were evaluated in the laboratory and clinic as antacid and antipepsin agents. The following is a description of the tests performed and summary of the test results:

METHODS AND MATERIALS

Evaluation of antacid properties (A) In vitro determination of acidity:

A test solution of 120 ml. distilled water and 25 ml. 0.1 N hydrochloric acid was prepared and the pH was measured using a Beckman Model G pH meter. The compound to be tested was added to this solution and the pH measurements were made after 5, 10, 15, 30, 45, and 60 minutes while the mixture was continuously stirred in a 25° C. water bath.

(B) In vivo determination of acidity:

Human subjects were selected for the study on the basis of the presence of free acid in each of the four 15-minute basal specimens from the gastric analysis, provided one or more of the samples contained at least 20 clinical units of free hydrochloric acid.

The basal gastric analysis was done as described in the literature. (Rider, J. A., and Moeller, H. C.: "Gastic Analysis, Diagnostic and Therapeutic Uses." Western Med. 4:84, March 1963.) Following this basal period the compound was studied as follows: The tableted compound was chewed and swallowed by the test subject with 10 cc. of water. After 15 minutes 3 to 4 ml. of gastric juice were aspirated and measured for pH using a Beckman Model G pH meter. In almost every instance some drug was visible as white particles in the aspirated samples. If the aspirated sample had a pH greater than 3.5, it was returned to the stomach. If the pH of the sample measured below 3.5, it was discarded. Samples were aspirated every 15 minutes for 60 minutes.

Evaluation of antipepsin properties

In vivo determination of antipepsin:

The control pepsin determination was done at the conclusion of the basal gastric analysis on a pooled filtered sample from the entire basal hour and the test effects were determined on 2 aliquots of the gastric juice from the test periods taken at 15 and 30 minutes after ingestion of the compound. The pepsin activity was determined by the method of West et al. (West, P. M., Ellis, F. W., and Scott, B. L.: "A Simplified Method for Determining the Excretion Rate of Uropepsin." J. Lab. Clin. Med., 39:159–162, January 1952), as modified by Rider et al. (Rider, J. A., Moeller, H. C., Althausen, T. L., and Sheline, G. E.: "The Effect of X-ray Therapy on Gastric Acidity and on 17-Hydroxycorticoid and Uropepsin Excretion." Ann. Int. Med., 47:651–665, 1957).

Clinical evaluation

The patients utilized in this study were private office patients selected in a random manner, and were symptomatic in spite of varied treatment programs usually consisting of a bland diet and the use of various antacids as needed. All patients had a history and physical examination, laboratory studies, and other appropriate diagnostic tests such as roentgenological examinations of the gastrointestinal tract and gastroscopy where indicated. The patients utilized in this study had diagnoses such as ulcer of the stomach or duodenum, or other related diseases such as gastritis, hiatal hernia, duodenitis, or marginal ulcer.

RESULTS

Evaluation of antacid properties (A) In vitro determination of acidity:

(1) In vitro.—The in vitro antacid effect of three doses of bismuth aluminate in amounts of .25 gm., .5 gm. and 1 gm. were compared. The results indicate that bismuth aluminate by itself is a poor antacid which did not raise the pH of the test solution above 3.

(2) Two tablets, each containing 100 mg. of bismuth aluminate, 300 mg. of aluminum hydroxide magnesium carbonate codried gel and 100 mg. of magnesium trisilicate effectively raised the pH of the test solution from a low of 2 to as high as 6.

(B) In vivo determination of acidity:

The in vivo effect of the administration of 200 mg. of bismuth aluminate, the administration of two tablets each containing 100 mg. of magnesium trisilicate and 300 mg. of aluminum hydroxide and magnesium carbonate codried gel, and the administration of two tablets, each containing 100 mg. of bismuth aluminate, 300 mg. of aluminum hydroxide magnesium carbonate codried gel and 100 mg. of magnesium trisilicate, were compared. The results established that the administration of the 200 mg. of bismuth aluminate alone did not raise the pH as measured after 15 minutes above 2, that the administration of the mixture of magnesium trisilicate and the codried gel did not raise the pH above 2.5, and the administration of the novel compositions containing both the bismuth aluminate and the antacid mixture raised the pH to about 4 within 15 minutes and maintained it above 3.5 for between 30 and 45 minutes.

Evaluation of antipepsin properties

In vivo determination of antipepsin:

The same patients as were involved in the above in vivo test were employed in a test designed to evaluate the antipepsin levels of the three agents, namely 200 mg. of bismuth aluminate, two antacid tablets each containing 300 mg. of the codried gel and 100 mg. of magnesium trisilicate, and two tablets each containing 100 mg. of bismuth aluminate, 300 mg. of the codried gel and 100 mg. of magnesium trisilicate. The gastric pepsin levels of the patients were measured prior to administration of the agents and 15 minutes thereafter. The results indicated that the administration of bismuth aluminate alone decreased the gastric pepsin level by 24% after 15 minutes. The administration of antacid mixture alone decreased the gastrict pepsin level on an average of about 2.5% and the administration of novel compositions containing both the bismuth aluminate and the antacid mixture decreased the gastric pepsin level approximately 72% after 15 minutes.

Clinical evaluation

To further evaluate the compositions of the present invention a clinical study was conducted involving 53 patients of whom 31 were men and 22 were women. The age range for the group was from 24 to 83 years. All of the patients were maintained upon a bland diet. The patients received daily doses ranging from one to two tablets, each containing 100 mg. of bismuth aluminate, 300 mg. of the codried gel and 100 mg. of magnesium trisilicate every hour, to one to two tablets four times a day. Most of the patients received an initial dose of one to two tablets every two hours. The period of treatment varied from one one week to seven months and the average duration of treatment was approximately two and one-half months. The patients were rated according to the following criteria: "excellent" if the patient was completely free of symptoms; "good" if the patient was essentially asymptomatic with an occasional symptom; "fair" if the patient had only slight relief of symptoms; and "poor" if the patient indicated there was no relief.

Table I summarizes the results obtained and indicates the nature of the gastric disorders which were represented by the clinical sample. From Table I it can be seen that with 50 patients, or over 90% of the patients, excellent or good results were obtained. The only side effects that were observed during the study were one complaint of occasional constipation, one complaint that the composition was too coarse in texture, and two complaints of dry mouth or dry throat.

TABLE I.—CLINICAL RESULTS

|  | Excellent | Good | Fair | Poor |
| --- | --- | --- | --- | --- |
| Duodenal ulcer | 10 | 5 | 1 | 0 |
| Duodenitis | 1 | 0 | 1 | 0 |
| Gastric ulcer | 3 | 0 | 0 | 0 |
| Gastritis | 10 | 13 | 0 | 1 |
| Marginal ulcer | 1 | 0 | 0 | 0 |
| Hiatal hernia | 2 | 5 | 0 | 0 |
| Total | 27 | 23 | 2 | 1 |
|  | 50 (94.3%) |  | 3 (5.7%) |  |

From the in vitro, in vivo and clinical tests, it can be concluded that the composition of bismuth aluminate and the antacid mixture comprised of the codried gel of aluminum hydroxide and magnesium carbonate and magnesium trisilicate is superior to either the bismuth aluminate or the antacid mixture taken individually as an antacid and an antipepsin agent.

I claim:

1. A composition in a dosage form selected from the group consisting of tablets and liquids for oral administration to produce an antacid and antipepsin effect, which composition contains 100 mg. of bismuth aluminate, 300 mg. of aluminum hydroxide-magnesium carbonate codried precipitate, and 100 mg. of magnesium trisilicate.

2. The composition of claim 1 in which the oral dosage form is a tablet.

3. The composition of claim 1 in which the oral dosage form is a liquid.

References Cited

UNITED STATES PATENTS

| 2,472,476 | 6/1949 | Hardt | 424—155 |
| 2,901,316 | 8/1959 | Roques | 23—52 |
| 2,918,407 | 12/1959 | Biel | 424—267 |

OTHER REFERENCES

The Pharmaceutical Journal, vol. 185, No. 5053, Sept. 3, 1960, p. 8.

ALBERT T. MEYERS, Primary Examiner

D. M. STEPHENS, Assistant Examiner

U.S. Cl. X.R.

424—154, 156, 157